Aug. 13, 1946. G. M. HOLLEY, JR 2,405,888
FUEL CONTROL VALVE
Filed Jan. 1, 1945 5 Sheets-Sheet 4

George M. Holley Jr.
INVENTOR.
BY
ATTORNEY

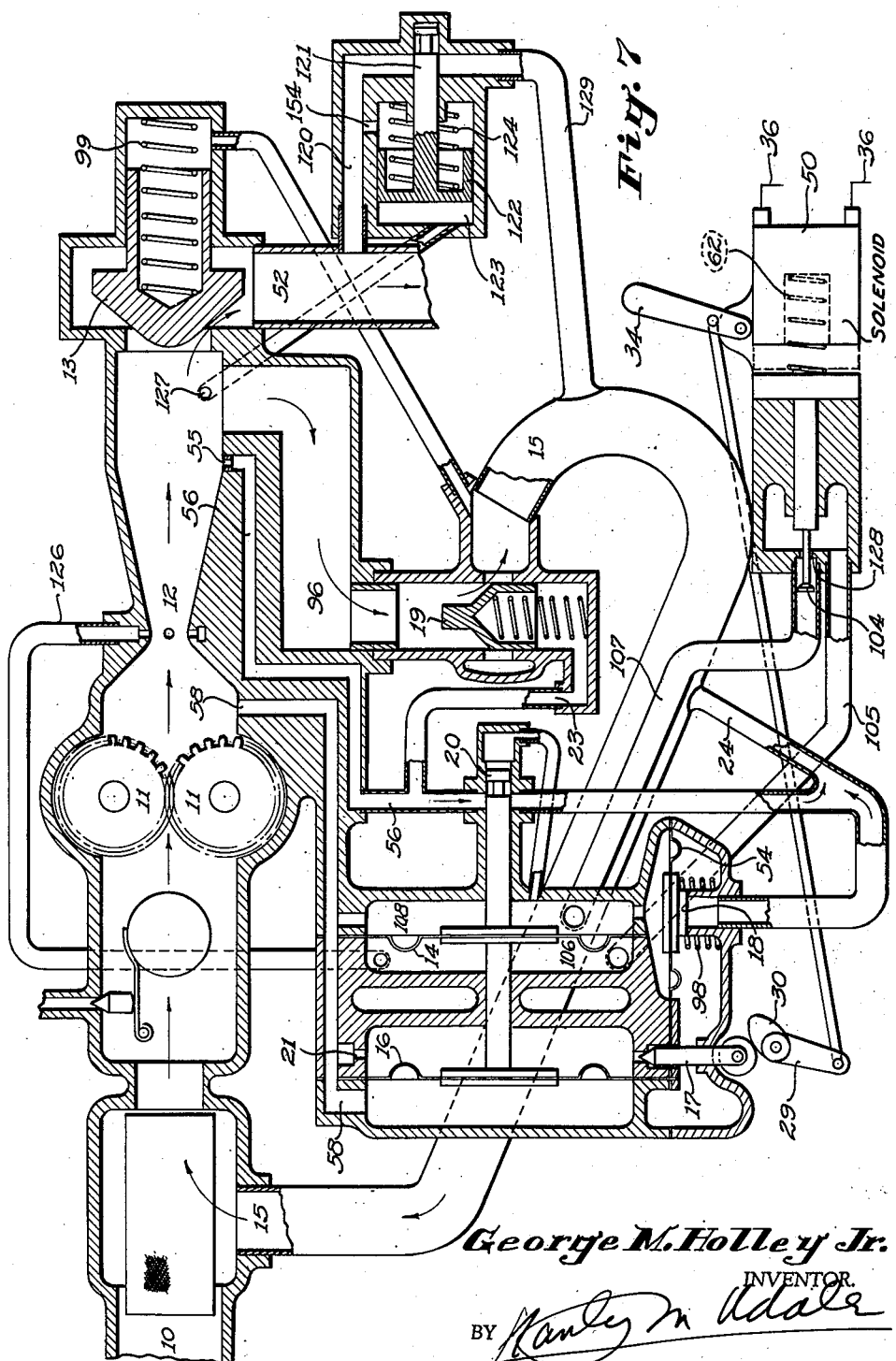

Patented Aug. 13, 1946

2,405,888

UNITED STATES PATENT OFFICE 2,405,888

FUEL CONTROL VALVE

George M. Holley, Jr., Grosse Pointe, Mich., assignor to George M. Holley and Earl Holley Application January 1, 1945, Serial No. 570,942

11 Claims. (Cl. 60—41)

The object of this invention is to automatically govern the speed of a prime mover and to vary the governed speed manually. Another object is to improve the control of the flow of liquid fuel to an engine. Another object is to improve the flow of liquid fuel to a burner in the combustion chamber of an external combustion engine of the gas-turbine type.

Figure 7 shows an alternative construction to that shown in Figure 1.

Figure 1:
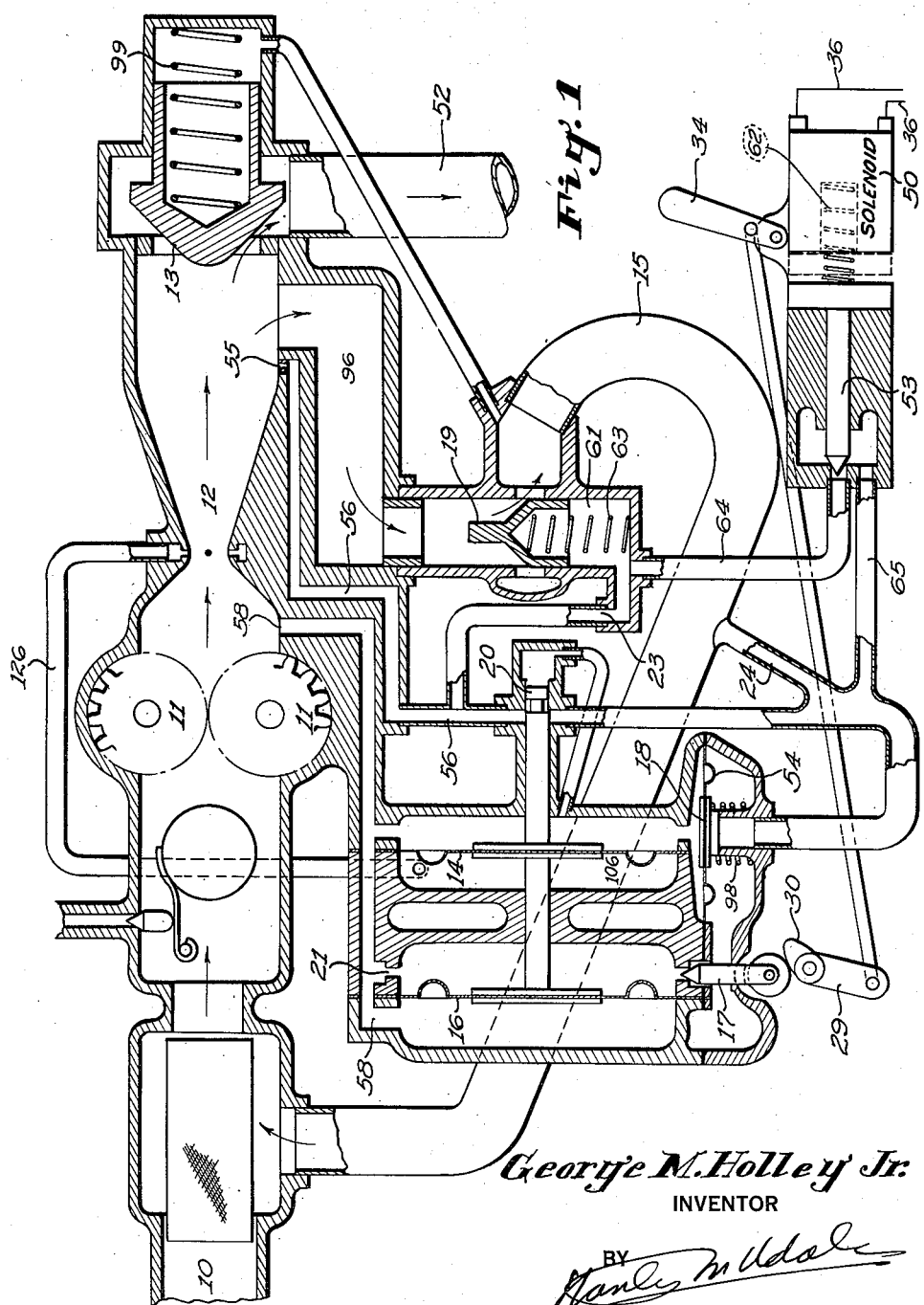
Figure 1 shows the elements of the preferred form of my invention.
Figure 2:
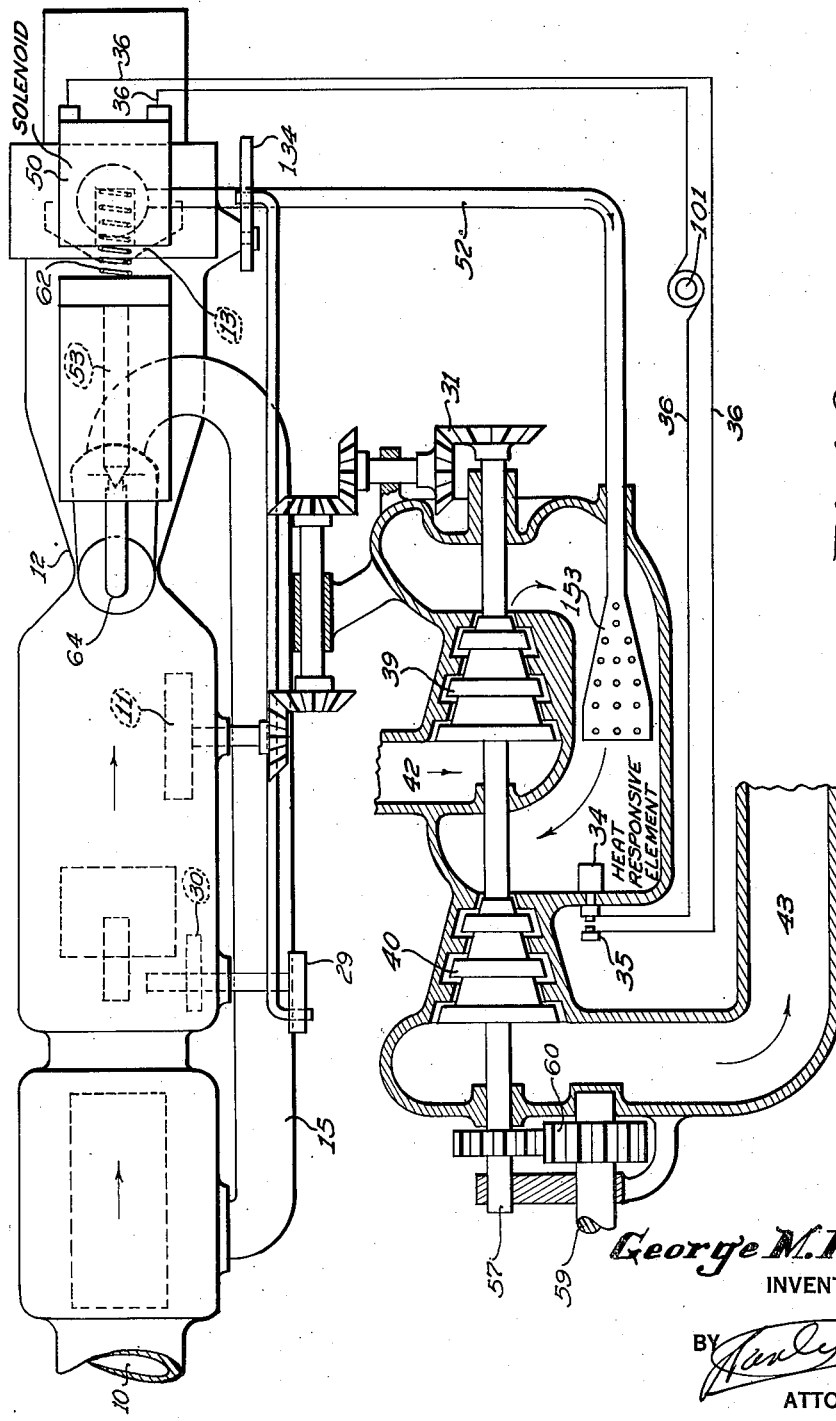
Figure 2 shows the application of the elements shown in Figure 1 to a gas turbine power plant adapted for use in aircraft.

In Figures 1 and 2, fuel enters at 10 through an engine-driven fuel pump 11 of the positive displacement type to a venturi 12, past a balanced valve 13 (closed by a compresison spring 99) to the pipe 52, burners 153 and to the turbine 40. The gears 31 drive the pump 11 and are driven by the turbine 40, which drives the compressor or supercharger 39 through a shaft 57.

In Figure 2, air enters at 42, flows through the supercharger 39, past the burners 153, heat responsive element 34, through the gas turbine 40 to the outlet 43. The drive shaft 57 is driven by the turbine 40 and drives the supercharger 39 and pump gears 31. Power is taken off shaft 59 from shaft 57 through gears 60 located between shafts 57 and 59. Shaft 59 usually drives a propeller.

In Figure 1, a diaphragm 14 is responsive to the pressure drop in the venturi 12, to the throat of which, chamber 106 is connected by pipe 126. The quantity of fuel flowing past the spring-loaded, balanced valve 13 is reduced by the quantity which returns through a bypass 96—15. The flow through this bypass 96—15 is determined by the valve 19. This valve 19 is supported by a compression spring 63 and by the fuel pressure admitted through the passage 23 connected to passage 56, restriction 55, as modified by a pilot valve 20, which is controlled by the diaphragm 14 and also by another diaphragm 16 connected to the diaphragm 14. The movement of the diaphragms 14 and 16 is determined by the movement of a needle 17, which is controlled by a manually-adjusted cam 30. The flow by the needle valve 17 is controlled by a valve 18 opened by a compression spring 98 and carried by a diaphragm 54, the upper face of which is subjected to the pressure on the right-hand side of the diaphragm 14, which communicates with the pressure at the entrance to the venturi 12 through a passage 58. The valve 18 maintains a constant pressure drop past the needle valve 17 so that fluctuation in pressure will not vary the flow.

The left-hand side of the diaphragm 16 is also subjected to the same pressure. A restriction 21 admits a certain quantity of the fuel under pressure to the chamber on the right-hand side of the diaphragm 16, and this quantity flows past the needle 17, valve 18, outlet 24 to bypass 15. Hence, the more the valve 17 is open, the greater the pressure drop at restriction 21 and the lower the pressure on the right-hand side of the diaphragm 16.

The valve 20, which is a pilot valve (for the valve 19), is connected to both diaphragms 14 and 16 and is therefore controlled by the joint action of these two diaphragms and thus regulates the hydraulic pressure acting below the valve 19 assisting the compression spring 63. The valve 19 controls the flow back from the passage 96 through the bypass 15 to the fuel entrance 10. The valve 20 controls the flow through the passage 56, which communicates with the outlet from the venturi 12 through a restriction 55.

In Figures 1 and 2, a manually-operated lever 134 controls the lever 29, which controls the cam 30, which controls the needle 17. The position of the lever 34 and the valve 17 controlled thereby thus determines the governed speed, at which speed the valves 20 and 19 are in equilibrium.

A solenoid 50 controls the valve 53, which establishes, when open, the connection from the cylinder 61 below the valve 19 and the fuel entrance 10 through the passages 65, 24 and 15. The valve 53 is closed by a compression spring 62. When the valve 53 is opened by electricity flowing through the electric magnet 50, pressure in the cylinder 61 is lowered, which therefore causes the valve 19 to descend and thus causes the flow through the bypass 15 to increase. Hence, when the temperature responsive element 34 establishes the contact 35 due to high temperature, electricity flows through the conductors 36 to the solenoid 50. This solenoid 50, when energized, attracts the needle valve 53, which is normally seated by a spring 62. An engine-driven electric generator 101 is shown as the source of power. However, a storage battery can be substituted for this engine-driven generator.

Figure 3:
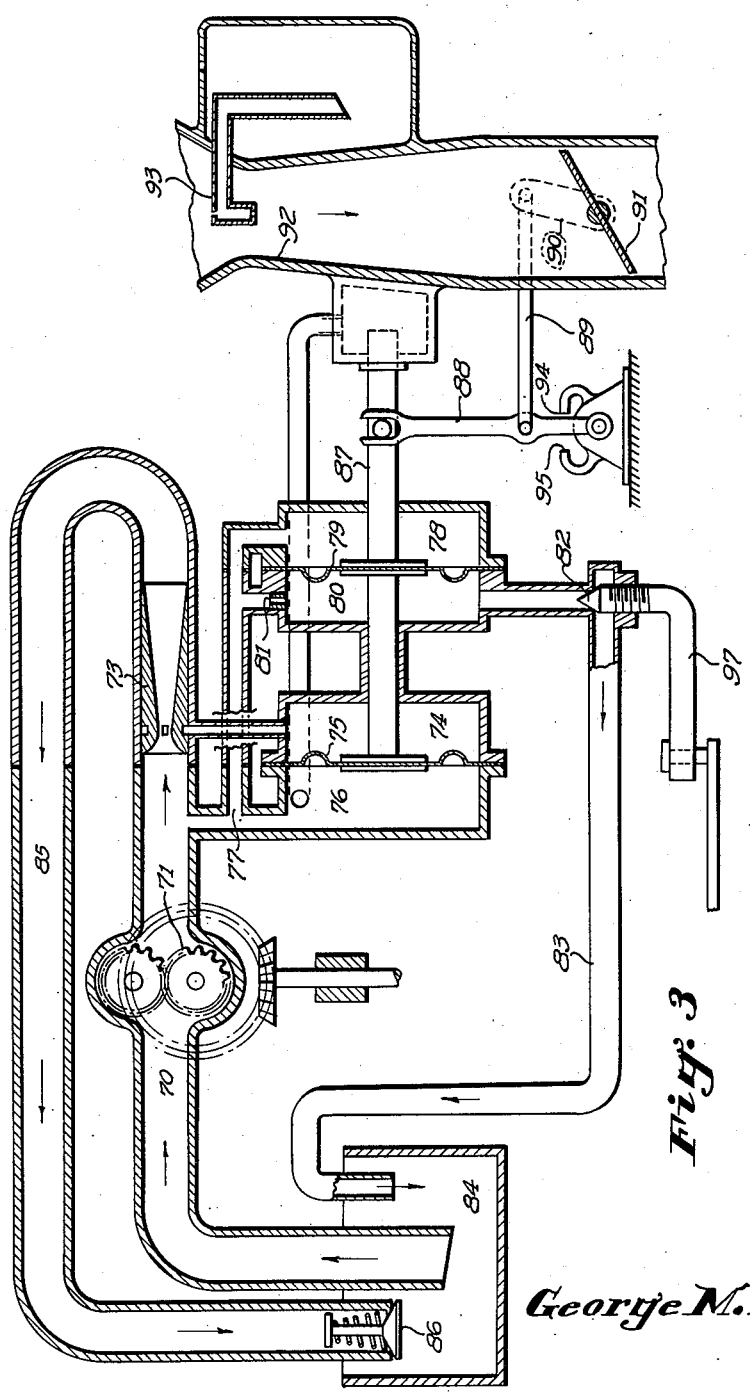
Figure 3 shows diagrammatically the essential elements of my invention in its simplest form.

Description of Figure 3

In Figure 3, 70 is the fluid entrance, 71 is the engine-driven pump, 73 is the venturi, 74 is the chamber connected to the throat of the venturi 73, 75 is a diaphragm forming one wall of the chamber 74, 76 is a chamber on the other side of the diaphragm 75 and is connected through a passage 77 to the entrance to the venturi 73. Passage 77 also communicates with the chamber 78 located to the right of a second diaphragm 79. To the left of the diaphragm 79 is located the chamber 80, which is connected to the passage 77 through restriction 81. 82 is an adjustable needle controlling the flow from the chamber 80 through a passage 83 back to the reservoir 84, from which the pump 71 obtains its supply of control fluid. The discharge from the venturi 73 is shown flowing back through a pipe 85 and discharging past a spring-loaded valve 86 to the reservoir 84.

A rod 87 connects the two diaphragms 75 and 79 together. A lever 88 is moved by the rod 87; a link 89 is shown connected to a lever 90, which controls a throttle 91, which throttle controls the flow through a venturi 92, into which venturi there discharges a fuel nozzle 93. Lever 97 controls the movement of the needle 82. When the needle 82 is closed and the engine running at its minimum speed, the lever 88 is pressed against the stop 94. Stop 95 limits the movement of the throttle towards the wide-open position.

Figure 4:
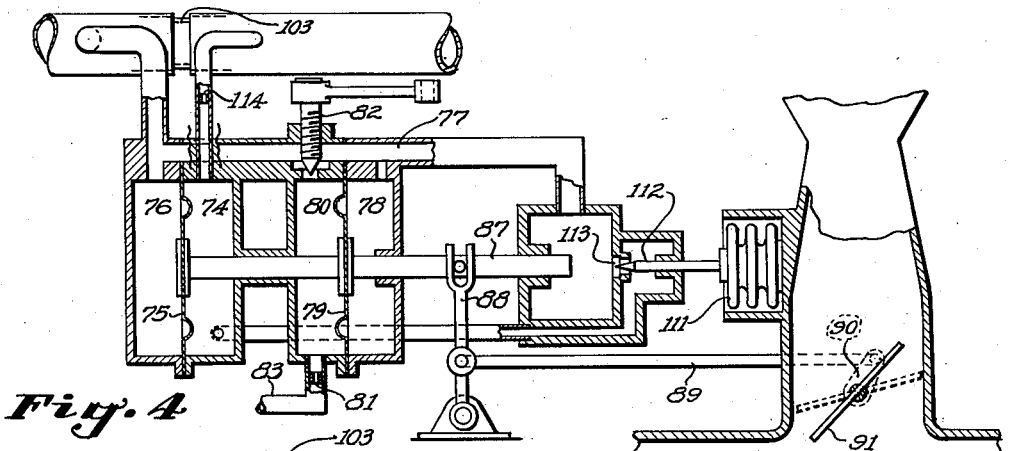
Figure 4 shows an alternative construction to that shown in Figure 3.

Description of Figure 4

In Figure 4, the valve 82 has been located where the restriction 81 is located in Figure 3, and the restriction 81 is located where the valve 82 is located in Figure 3. A restriction 103 replaces the venturi 73; otherwise, the construction is the same as Figure 3, except that a thermostat 111 operates a valve 112 to close the flow through an orifice 113 when the temperature of the thermostat 111 exceeds a predetermined value. A restriction 114, between the chamber 74 and a point downstream of restriction 103, is required to make the thermostat 111 effective. A hot spot 115 is controlled by valve 117. This valve drives the exhaust gases over the hot spot and through the outlet 116 when it is closed; when it is open, it shuts the exhaust off away from the hot spot.

Figure 5:
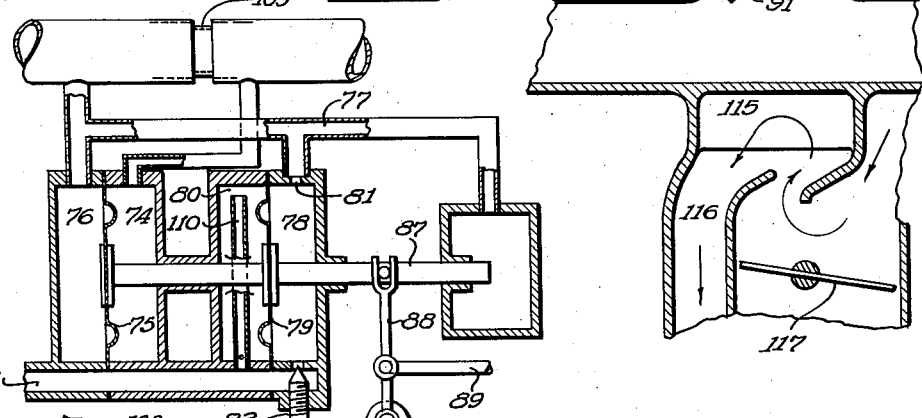
Figure 5 shows an alternative construction to that shown in Figure 3.

Description of Figure 5

In Figure 5, the valve 82 is located at the bottom of chamber 78, and the restriction 81 is located at the top of chamber 78. Through 81, the high pressure fluid is admitted through the passage 77. The pipe 110 connects the chamber 80 to the low pressure return pipe 83. In Figure 5, as in Figure 4, a restriction 103 in the main outlet from the pump 71 replaces the venturi 73 shown in Figure 3.

Figure 6:
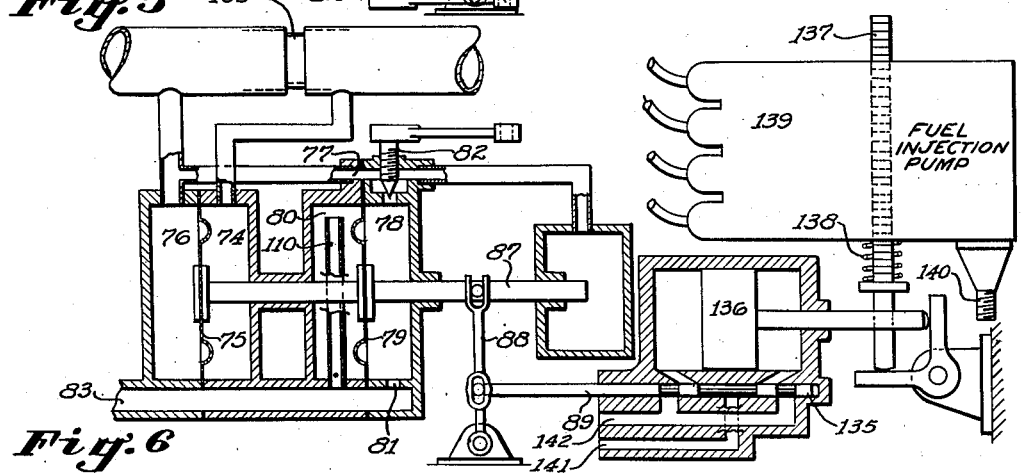
Figure 6 shows an alternative construction to that shown in Figure 3.

Description of Figure 6

In Figure 6, the valve 82 is located in the upper part of chamber 78, into which the fluid under pressure is admitted from passage 77. Pipe 110 connects the chamber 80 to the low pressure return pipe 83. The restriction 81 is located at the bottom of chamber 78. A servomotor valve 135 controls the movement of a servomotor piston 136, which engages with a rack 137, which is held in engagement by spring 138. A Diesel-engine type fuel injection pump is shown at 139 driven by a shaft 140, which is driven by the engine. Oil under pressure to operate the servomotor is admitted through passage 141 and escapes through passage 142.

Description of Figure 7

In Figure 7, the valve 104, controlling a restriction 128, replaces the valve 53, and the pipe 105 replaces the pipe 65 and is connected to the chamber 106 to the left of diaphragm 14. Pipe 107 replaces pipe 64 and is connected to the chamber 108 to the right of diaphragm 14.

A by-pass 120—129 is located downstream of valve 13 in the pipe 52. This bypass is interrupted by a valve 121 carried by a piston 122 in a cylinder 123. A spring 124 pushes the piston 122 and the valve 121 to the left, in which position the bypass 120—129 will communicate with the low pressure return passage 15. A passage 127 connects the left-hand end of the cylinder 123 and the downstream end of venturi 12. Bypass 120 communicates through a passage 154 with the cylinder 123 to the right of the piston 122, so that piston 122 is subjected to the pressure drop at the valve 13.

Operation

In Figures 1 and 2, the pump 11 is driven by the gas turbine 40, operated by the fuel passing the valve 13. Hence, if the turbine rotates at an excessively high speed, the pump 11 will deliver an excessive quantity of liquid through the venturi 12, which will cause a low pressure in chamber 106 to the left of the diaphragm 14, which will move the servomotor valve 20 to the left. A low pressure in passage 23 results because the passage 23 will then be connected to the passage 24 through the valve 20 and the passage 56 is connected to the venturi 12 through restriction 55. The passage 24 communicates with the by-pass 15, and hence with the relatively low pressure existing in the fuel entrance 10.

Hence, the valve 17 provides a manual control for the speed, except at high operating temperatures. At high temperatures, the contacts 35 are closed and solenoid 50 becomes operative, so that the valve 53 is moved to the right and some of the fuel under pressure in cylinder 61 below the valve 19 escapes through the pipes 64—65. The valve 19 then tends to fall, as the spring 63 is not stiff enough to hold the valve up against the pressure in the outlet 96 leading from the venturi 12.

Operation of Figure 3

Assuming that the needle 82 is closed and the engine is idling, then the flow through the venturi 73 causes a drop of pressure in the chamber 74. Pressure in the chamber 78 equals the pressure in the chamber 80. Hence, the rod 87 is pushed over to the right against the stop 94, which determines the minimum opening of the throttle 91 of the carburetor 92—93, and thus the minimum operating speed of the engine. When the needle 82 is opened, a flow occurs from the downstream side of the pump 71 through the passage 77, through the restriction 81, into the chamber 80, past the needle 82, along the passage 83 and back to the reservoir 84. Pressure in the chamber 80 is reduced due to the pressure drop at restriction 81. The rod 87 thereupon moves to the left. The lever 88 moves away from the stop 94, the throttle 91 opens, the speed of the engine increases, the speed of the pump 71 increases the flow through the venturi 73, and increases the depression in the chamber 74 until it is equal to the depression in the chamber 80. When the system is in equilibrium, the throttle 91 no longer opens. This system therefore consists of an engine-driven pump, which produces a flow of governing fluid proportional to the speed of the engine. A venturi in the path of this flow creates a pressure difference, which acts on a diaphragm 75, which moves in opposition to the diaphragm 79, the pressure difference acting upon which is controlled by the valve 82 and represents the simplest form of my invention. Assuming that the throttle 91 is free from friction, a constant speed will be maintained at each position of the valve 82, regardless of the load on the engine until such time as the throttle 91 is wide open.

*Operation of Figure 4*

When the speed control valve 82 is opened, the pressure in chamber 80 increases. An increase in pressure in chamber 80 tends to close the throttle 91 just as in Figure 3, the closing of valve 82 tends to open the throttle 91. In Figure 4, when the valve 82 is closed, then the pressure in chamber 80 falls to the minimum value established by the return pipe 83, and the pressure in the chamber 78 then opens the throttle 91 wide, and the drop across the obstruction 103 would never be great enough to close the throttle. For this reason, the valve 82 is not permitted to close completely. The thermostat 111 automatically reduces the governed speed. When 111 expands, valve 112 moves to the left, restricting opening 113. Restricting 113 lowers the pressure in chamber 74 because of the restriction 114. The resulting movement of the diaphragm 75 to the right closes the throttle.

*Operation of Figure 5*

When the valve 82 closes, the pressure in chamber 78 increases and the lever 88 moves to the left and thus the throttle 91 opens. When the valve 82 opens, the pressure in chamber 78 falls to the low pressure in the return pipe 83, and the throttle 91 closes under the influence of the pressure drop across the restriction 103.

*Operation of Figure 6*

When the valve 82 opens, the pressure in chamber 78 increases and the valve 135 moves to the left to increase the governed speed. When the valve 82 closes, the pressure in chamber 78 falls to the pressure in the return pipe 83, and the valve 135 moves to the right under the influence of the pressure drop across the restriction 103.

The servomotor valve 135 is moved by the connection 89 and causes the piston 136 to move and thus move the rack 137, which controls the discharge from the pump 139, which is driven at either engine speed or one-half engine speed. By controlling the amount of fuel by the rack 137, the speed of the engine is also controlled.

In Figures 3, 4, 5 and 6, the travel of the valve 82 is limited so that at the critical speed, when there is danger from excessive speed, then the drop in the venturi 73 (Figure 3) or the drop across the restriction 103 (Figures 4, 5 and 6) prevents excessive speeds occurring.

*Operation of Figure 7*

In Figure 7, when the solenoid 50 causes the valve 104 to move to the right, the flow from the passage 58 through the orifice 128 by way of pipes 105 and 107 ceases. Hence, the Venturi drop, which has been partially dissipated by this flow through the restriction 128, is restored to its full value. Hence, the Venturi drop becomes more effective and the valve 20 responds to a lower revolution per minute of the displacement pump 11. Hence, the governor continues to govern, but governs at a lower speed.

When the cam 30 is moved so that valve 17 is opened suddenly, an increased flow is established through the restriction 21, the servomotor valve 20 suddenly moves over to the right. The fuel will no longer flow down passage 56. Hence, the full pressure of the fuel pump 11 is transmitted through the passage 23 to the underside of the valve 19, which suddenly closes, causing a sudden increase in flow in the pipe 52 past the valve 13. The inertia effect of the sudden increase in flow down the pipe 52 causes a decrease in the pressure drop past the valve 13, which gives an increase in the pressure transmitted through pipe 120 to the right of the piston 122. This increase, assisted by the compression spring 124, moves the valve 121 to the left, which permits some of the fuel flowing in the pipe 52 to escape through the passage 120 past the valve 121 through the passage 129 to the return passage 15.

What I claim is:

1. In a fluid-operated governor for a variable speed engine having a power control means comprising a source of operating fluid for said governor, a positive displacement pump connected thereto having a main outlet passage, means for driving said pump at a speed proportional to the speed of said engine, a leakage bypass leading from the downstream side of said pump to the source of operating fluid, a manually variable leakage orifice and a fixed orifice located in series in said bypass, a first chamber communicating with the bypass between said orifices, a movable wall in said chamber responsive to the variable pressure between the fixed orifice and the variable orifice, an obstruction in said main passage adapted to create a pressure drop proportional to the square of the speed of the engine, a second and third chamber connected to said main outlet passage, one chamber connected upstream from said obstruction, the other chamber connected downstream from said obstruction, a second movable wall common to said second and third chambers so as to be responsive to pressure drop at said obstruction, means connecting both moving walls to said power control means whereby the power is controlled manually by the manually variable leakage orifice and the maximum speed is limited automatically.

2. A device as set forth in claim 1 in which there is a fourth chamber connected with the downstream side of said pump and located on the side of the first diaphragm opposite to said first chamber.

3. A device as set forth in claim 1 in which there is a fourth chamber connected with the outlet from the two orifices in series and located on the side of the first diaphragm opposite to said first chamber.

4. In a fluid-operated governor for variable speed engines having a power control means comprising a source of operating fluid, a displacement pump connected thereto, means for driving said pump at a speed proportional to the speed of said engine, a venturi in the outlet from said pump, means responsive to the drop in pressure in said venturi to move said power control means to limit the speed of said engine, a fixed orifice, a passage connecting said orifice with the pressure side of said pump, a second passage connecting said orifice with a manually variable leakage orifice in series with said first orifice and located in the said outlet, means responsive to the variable drop across said fixed orifice to oppose the means responsive to drop in pressure in said venturi so as to vary the speed of said engine.

5. A combined manual and automatic control means for the burner of a gas turbine having a combustion chamber and a source of fuel, a turbine-driven fuel pump of the positive displacement type, a fuel discharge passage, a fuel venturi therein located downstream from said pump, a first chamber having a first moving wall responsive to the pressure drop in said venturi, a leakage bypass in said fuel passage leading from the relatively unrestricted portion of said fuel discharge passage downstream from said fuel pump to the entrance to said pump, a second chamber having a second moving wall connected to said bypass, a manually controlled valve in said leakage bypass adapted to cause a variable pressure drop on one side of said second moving wall, a servomotor valve operatively connected to both of said moving walls, a fuel relief outlet, a relief valve therein adapted to open whenever said servomotor valve is moved from its neutral position so as to permit the escape of a considerable portion of the fuel to the source of fuel entering the pump when the drop in pressure through said venturi is sufficient to open said servomotor valve, the determination of the specific drop being determined by the manually-controlled valve.

6. A device as set forth in claim 5 in which there is a passage around said servomotor valve, a valve in said passage adapted to open in response to a rise in temperature of the combustion chamber of said gas turbine so as to open said relief valve independently of the opening of said servomotor valve in response to said manual and automatic control means.

7. A hydraulic governor for a prime mover comprising a liquid pump of the positive displacement type driven by the prime mover, an outlet from the pump, a venturi in the outlet, a first chamber, a moving wall dividing said first chamber into two, a passage connecting the chamber on one side of said diaphragm to the throat of said venturi, a passage connecting the chamber on the other side of said moving wall with the pressure side of said liquid pump, a second chamber, a second moving wall therein, the chamber to one side of said second moving wall being in free communication with the pressure side of said liquid pump, a restricted passage connecting the chamber on the other side of said second moving wall with the pressure side of said liquid pump, a second passage connecting said chamber with the entrance to said liquid pump, a manually-controlled regulating valve in said passage adapted to control the flow through said restricted passage, a control means for said prime mover, a connection from said control means to both of said moving walls, said moving walls being adapted to move in opposition to each other, whereby on opening said regulating valve, the prime mover control means is automatically moved to give a higher speed to the prime mover and the increase of speed of the prime mover creates a lower pressure in the throat of said venturi thereby decreasing the tendency of said prime mover to move so as to limit the speed of said prime mover to the speed at which the depression in the venturi balances the drop in pressure in said restricted passage.

8. A device as set forth in claim 7 in which there is a temperature responsive means associated with said prime mover, a valve movable thereby, a passage connecting the chamber on one side of said first diaphragm with the chamber on the other side, a restriction in said passage, said valve being adapted to close when the temperature of the prime mover exceeds a predetermined maximum temperature whereby the drop in pressure due to the flow through said venturi becomes more effective and the prime mover is governed at a lower speed.

9. A speed governor for a prime mover comprising a source of liquid, a pump of the positive displacement type and driven by said prime mover so as to create a flow of said liquid proportional to speed of said prime mover, a restriction in said flow, speed decreasing means for said prime mover responsive to the pressure drop at said restriction, balancing means adapted to oppose said speed decreasing means comprising a leakage passage leading from the pressure side of said pump back to said source, a variable restriction in said leakage passage means responsive to the drop in pressure at said variable restriction due to the flow through said leakage passage to oppose and balance the said first pressure drop, manual means to vary said leakage flow to control the said second drop in pressure so as to control the governed speed of said prime mover.

10. A device as set forth in claim 9 in which there is a bypass adapted to reduce the effectiveness of said pressure drop in said restriction and valve means responsive to the temperature of said prime mover located in said bypass and adapted to close said bypass when the said temperature exceeds a predetermined value.

11. A speed governor for a prime mover comprising a pump of the positive displacement type, a main passage connected to said pump, means for driving said pump so as to produce a flow of fluid under pressure in said main passage proportional to the speed of said prime mover, a chamber, a moving wall dividing said chamber into two parts, a connection from one part of said chamber to a point in said passage, a connection from the other part of said chamber to a point in said passage where the pressure is influenced by the velocity of flow, a second chamber, a second moving wall dividing said second chamber into two parts, two connections, one from each part of said second chamber to said main passage, a leakage passage from one part of said second chamber leading to a low pressure outlet, manually controlled means for regulating said leakage flow so as to lower the pressure in one part of said second chamber, means for controlling the speed of said prime mover connected to both of said moving walls, the low pressure responsive to said leakage flow being adapted to oppose the difference of pressure due to the flow through said main passage.

GEORGE M. HOLLEY, Jr.